No. 614,083. Patented Nov. 15, 1898.
J. BUTTERWORTH.
DRYING CYLINDER FOR TEXTILE MACHINERY.
(Application filed Jan. 6, 1898.)

(No Model.)

WITNESSES:

INVENTOR:
James Butterworth
By his atty

UNITED STATES PATENT OFFICE.

JAMES BUTTERWORTH, OF PHILADELPHIA, PENNSYLVANIA, ASSIGNOR TO THE H. W. BUTTERWORTH & SONS COMPANY, OF PENNSYLVANIA.

DRYING-CYLINDER FOR TEXTILE MACHINERY.

SPECIFICATION forming part of Letters Patent No. 614,083, dated November 15, 1898.

Application filed January 6, 1898. Serial No. 665,777. (No model.)

*To all whom it may concern:*

Be it known that I, JAMES BUTTERWORTH, of the city and county of Philadelphia and State of Pennsylvania, have invented an Improvement in Drying-Cylinders for Textile Machinery, of which the following is a specification.

My invention has reference to drying-cylinders for textile machinery; and it consists of certain improvements which are fully set forth in the following specification and shown in the accompanying drawings, which form a part thereof.

Heretofore it has been customary to support the large drying drums or cylinders in suitable bearings, also constituting stuffing-boxes for receiving the hollow shafts or journals and through which the drying media, such as steam, is forced for imparting heat to the drying-cylinder. The hollow shaft or journal portions of the drying-cylinder are supported in solid bearings, which of necessity require lubrication. The fitting is not very tight and in time the wear usually makes the bearings still more loose. The effect of this is that the lubricant finds ready escape from the said bearings, and this is facilitated by the fact that the hot steam passing through the hollow journals tends to keep the lubricant in a very fluid condition, permitting it to work out more readily. A very material defect and trouble which arises from this is that the oil works out upon the driving-gear and also upon the heads of the cylinders, which, owing to their position and rotary action, extends to the periphery and is transferred to the fabrics being dried, causing great damage to the cloth at times and great inconvenience and annoyance to the manufacturer.

The object of my invention is to overcome this defect, and in securing this end I provide the stuffing-box journal-bearings with means to convey the oil away from the bearings before it arrives at the end thereof adjacent to the cylinder-heads, so that all excess of oil is removed, and hence is not conveyed to the cylinder and ultimately to the cloth, as has heretofore been the case, and in my preferred construction the means employed to secure this end is an annular groove in the journal-bearing at the end nearest to the cylinder and furnished with a discharge-passage by which the collected oil may pass off.

My improvements will be better understood by reference to the accompanying drawings, in which—

Figure 1:
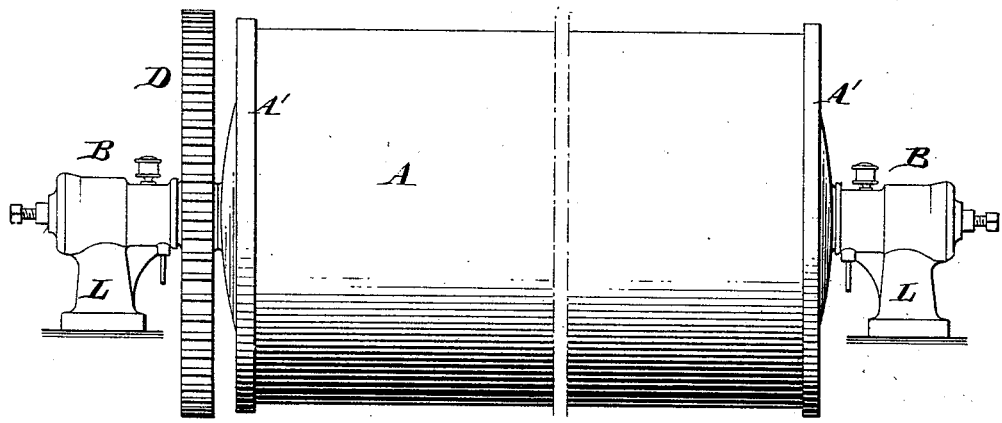
Figure 1:
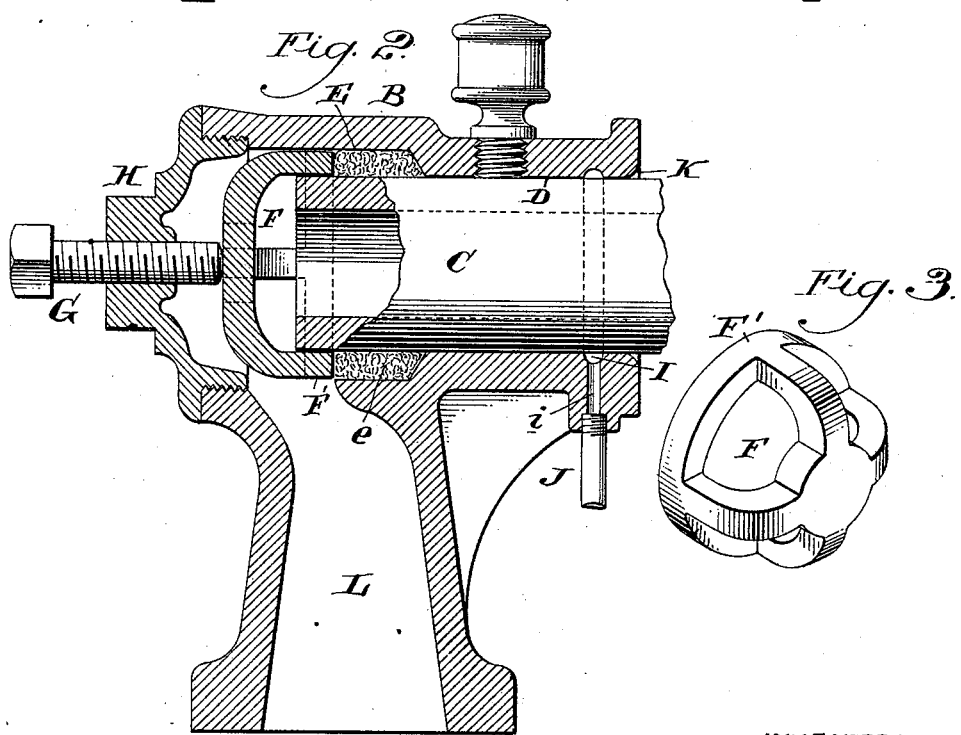

Figure 1 is an elevation of a drying-cylinder embodying my improvements. Fig. 2 is a sectional elevation through one of the stuffing-boxes and journal-bearings and journal of the cylinder, and Fig. 3 is a perspective view of one of the glands.

A is the cylinder, usually formed of sheet metal, secured to the heads A' A', each of which is provided with hollow journals C for permitting steam to enter the cylinder at one end and leave it at the other.

D' is the driving-gear, secured upon one of the journals adjacent to the head of the cylinder and is employed to rotate the cylinder in its bearings, so as to remove any strain upon the cloth.

B B are the journal-bearings and are of the construction shown in Fig. 2.

The bearings B are preferably formed of a solid casting, having a horizontal bearing-aperture D bored out to fit the outside of the hollow journals C and which directly receive the weight of the cylinder. The upper part of the journal-bearing is enlarged, as at E, to form an annular space to receive the packing e.

F is a gland having an annular part F', which encircles the hollow journal and operates upon the packing e. The gland F is made of open-work or cage construction, so as to permit the ready passage of steam into the end of and through the hollow journal. The gland is pressed upon the packing e by a set-screw G, which tightly fits through a head H, firmly secured upon the open end of the bearing to inclose the stuffing-box and gland. The removal of this cap H permits the gland F to be taken out and fresh packing to be inserted when desired. The bearing B is furthermore provided with an upright hollow pedestal L, through which steam is permitted to pass upward into the stuffing-box, and thence through the gland and into the hollow journal. The bearing is bolted upon the usual stand of the drying-cylinder. Owing to the necessity of making the parts steam-tight it is customary to form the outer part of the bearings as a solid casting and bore the same out to properly receive the hollow journal; but it is evident from this that in use the journal or bearing, or both, will wear and tend to increase the looseness and possibility of clearance. While this may not materially affect the proper mechanical operation of the apparatus as an entirety, it secures one very grave defect—namely, that the oil which is supplied to the bearing D for lubricating purposes is permitted to work its way freely out of the end of the bearing on the gear or head of the cylinder, and thus be communicated to the fabric being dried. To prevent this, I form in the bearing D, near the end adjacent to the cylinder-head or gear, an annular groove I, into which the surplus oil may work its way and be conveyed off at the bottom through a passage-way $i$, communicating with a pipe J for delivering the escaping oil to any suitable place and collected for use over again. The annular groove I, while preferably extending all the way around, might, if desired, end or terminate at about two-thirds way from the bottom, for the reason that the greatest tendency of the oil to work toward the end of the bearing will be in the lower half thereof and upon each side where the greatest thrust results between the journal and bearing, for it is at this place that the greatest capillary attraction will result and where the greatest pumping action due to vibration of the bearing in the journal will occur.

I prefer also to form the extreme outer edge of the bearing D with a curved edge, as at K, to aid in carrying the oil away from the journal in case of any passing beyond the annular groove I, due to inadvertent flooding or other defective operation—such, for instance, as if the lower portion of the annular bearing I became clogged and bridged the gap between the two inner surfaces of the bearing.

I do not confine myself to the minor details in the general construction of the stuffing-boxes, as they may be modified or varied without departing from the spirit of the invention.

Having now described my invention, what I claim as new, and desire to secure by Letters Patent, is as follows:

1. The combination of a drying-cylinder having hollow journals at each end, combined with bearings each formed of a stuffing-box and an integral journal-bearing in alinement and in which the bearing acts as one end of the stuffing-box and in which the stuffing-box is provided with a passage to supply steam or drying media thereto and the journal-bearing is provided with an internal groove or clearance-space directly in its bearing-surface and adjacent to its end farthest from the stuffing-box and nearest to the drying-cylinder and formed with a passage-way leading from the clearance-space to convey excessive quantities of oil away from the bearing.

2. The combination of a drying-cylinder having a hollow journal, with a stuffing-box bearing comprising a journal portion for receiving the thrust of the journal and a stuffing-box made integral therewith and surrounding the end of the journal and in which the bearing at the end farthest from the stuffing-box is provided with a groove or channel directly upon its inner bearing-surface for conveying away the surplus oil which may tend to work toward the cylinder, an adjustable gland surrounding the end of the journal for compressing the packing in the stuffing-box, and means to adjust the gland.

3. A drying-cylinder provided with a hollow journal C, in combination with a bearing and stuffing-box made continuous and integral and consisting of a bearing D to receive and support the journal and a stuffing-box arranged in alinement with the bearing and inclosing the end of the hollow journal and in which the bearing D is provided with an annular groove or recess I directly in its bearing-surface near its end farthest from the stuffing-box furnished with an outlet leading to the outside of the bearing and further having its extreme end curved outwardly as at K to form a guide to convey the oil which might escape away from the surface of the hollow journal.

In testimony of which invention I hereunto set my hand.

JAMES BUTTERWORTH.

Witnesses:
J. W. KENWORTHY,
R. M. HUNTER.